United States Patent [19]

Kitazume et al.

[11] Patent Number: 4,971,825
[45] Date of Patent: * Nov. 20, 1990

[54] PROCESS FOR PRODUCING SOY BEAN MILK

[75] Inventors: Kiyoshi Kitazume, Chiba; Shuzo Sakuma, Saitama; Yasuharu Nakamura, Chiba; Hiromichi Ochiai, Musashino; Hisashi Nozaki, Shiki, all of Japan

[73] Assignee: Kibun Company Limited, Tokyo, Japan

[*] Notice: The portion of the term of this patent subsequent to Dec. 5, 2006 has been disclaimed.

[21] Appl. No.: 296,379

[22] Filed: Jan. 9, 1989

Related U.S. Application Data

[63] Continuation of Ser. No. 809,758, Dec. 17, 1985, abandoned.

[30] Foreign Application Priority Data

Dec. 21, 1984 [JP] Japan ............................. 59-268598
Sep. 21, 1985 [JP] Japan ............................. 60-207764

[51] Int. Cl.⁵ .............................................. A23L 1/36
[52] U.S. Cl. ..................................... 426/598; 426/634
[58] Field of Search ................ 426/801, 580, 598, 74, 426/330.3, 330, 629, 634, 654

[56] References Cited

U.S. PATENT DOCUMENTS

| | | | |
|---|---|---|---|
| 3,288,614 | 11/1966 | Miles | 426/598 |
| 3,901,978 | 8/1975 | Nelson et al. | 426/598 |
| 3,981,234 | 9/1976 | Nelson et al. | 426/507 |
| 4,039,696 | 8/1977 | Marquardt et al. | 426/598 |
| 4,041,187 | 9/1977 | Nelson et al. | 426/598 |
| 4,137,339 | 1/1979 | Kudo et al. | 426/507 |
| 4,318,933 | 3/1982 | Miller | 426/507 |
| 4,409,256 | 10/1983 | Johnson et al. | 426/598 |

FOREIGN PATENT DOCUMENTS

| | | |
|---|---|---|
| 8400476 | 2/1984 | PCT Int'l Appl. . |
| 387823 | 9/1976 | Sweden . |
| 433698 | 6/1984 | Sweden . |

*Primary Examiner*—Carolyn Paden
*Attorney, Agent, or Firm*—Browdy and Neimark

[57] ABSTRACT

This invention is a process of producing soy bean milk in which soy beans are crushed in an aqueous hot medium and then the crushed soy beans are maintained at a high temperature in the aqueous hot medium.

Since crushing soy beans were performed in the aqueous hot medium instead of grinding, the decrease in the protein extraction rate caused by subsequent high temperature-maintaining was able to be prevented, with lipoxidase or both lipoxidase and trypsin inhibitor being substantially deactivated.

1 Claim, 3 Drawing Sheets

PROCESS FOR PRODUCING SOY BEAN MILK

This application is a continuation of application Ser. No. 809,758, filed 12-17-85, now abandoned.

FIELD OF THE INVENTION AND RELATED ART STATEMENT

This invention relates to a process of producing soy bean milk by which a protein extraction rate is increased.

As for details, this invention relates to a process of producing soy bean milk in which lipoxidase, or lipoxidase and trypsin inhibitor were substantially deactivated before grinding and the decrease in the protein extraction rate is prevented as well as by a heating-process to deactivate the enzymes.

BACKGROUND OF THE INVENTION

Soy bean milk has been generally produced by heating soy beans in hot water of above 98° C. for several minutes, grinding the heated soy beans together with the hot water with deactivation of lipoxidase, and then separating the liquid from the ground material.

In addition, in the production of soy bean milk, there have been made various attempts to eliminate the lipoxidase which cause the raw odor of soy beans which can be sensed when drinking soy bean milk.

However, it has also been revealed that there is a large amount of the trypsin inhibitor in soy beans, and in some cases, the activity of the trypsin in the stomach is decreased, resulting in indigestion of the protein of soy beans.

In addition, it has been also found that maintaining the ground soy beans at a temperature of 95° C. or more is required to deactivate the trypsin inhibitor together with the lipoxidase.

However, it has become a problem in producing soy bean milk that as the temperature in the grinding process for soy beans is raised as described above in order to deactivate the enzyme, the protein extraction rate and the yield of soy protein are lowered increasingly.

OBJECT AND SUMMARY OF THE INVENTION

The present inventors have changed the concept of the prior process and have made an earnest study on methods for deactivating the enzyme while preventing the thermal denaturation of soy bean protein in maintaining the ground soy beans at a high temperature and, consequently, have found that the only possible way is to deactivate the enzymes completely before grinding soy beans.

The present inventors, therefore, have made a further earnest study on the complete deactivation of the enzymes before grinding, and consequently, have discovered that the enzymes are substantially able to be deactivated and the thermal denaturation of the protein is able to be prevented to the utmost by crushing the soy beans in an aqueous hot medium and then maintaining the crushed soy beans as they are in a hot water at high temperatures.

The protein extraction rate is increased by subsequently grinding the crushed soy beans which have been subjected to the prevention of the thermal denaturation of the protein, and separating insoluble solid contents.

In this invention, the lipoxidase deactivated by maintaining the crushed soy beans at a high temperature of 85°–90° C. or more, while however, the trypsin inhibitor remains.

In addition, in this invention, the lipoxidase can be deactivated by maintaining the crushed soy beans at a high temperature of 95° C. or more and the trypsin inhibitor is substantially deactivated.

In this invention, the substantial deactivation of the trypsin inhibitor means that the activity of the trypsin inhibitor becomes 10 TIU/mg protein or less. Consequently, when the activity of the trypsin inhibitor in soy bean milk becomes 10 TIU/mg protein or less, the inhibition of trypsin in the stomach is not caused substantially by drinking the soy bean milk.

This invention is characterized by crushing soy beans, adding a hot aqueous medium, and maintaining the crushed slurry as it is at a high temperature.

Aqueous media usable in this invention include water, 0.05–1.0% aqueous solutions of sodium bicarbonate and an aqueous solution of phosphate, etc. (hereinafter the aqueous media are simply referred to as water).

This invention is very characterized by crushing soy beans in a hot water. The crushing is quite distinguished from grinding and the soy beans which are obtained by crushing have a wide range of size, namely, the size of half of one bisected soy bean and preferably a size of about 0.2–2.0 mm square and more preferably a size of about 0.5–1.0 mm square. Within the above-specified range, soy beans can be crushed in a hot water with a device selected appropriately depending on the desired particle size. Since the greatest amount of the lypoxidase exists near the outer layer of the skin of soy beans, it is unnecessary to crush soy beans finely in order to deactivate the lipoxidase thermally. On the contrary, fine crushing has to be avoided since it thermally denatures the protein to decrease the extraction rate.

The stating material used in this invention includes various forms of soy beans such as soy beans with skins, those peeled and bisected and those simply washed with water.

Figure 1:
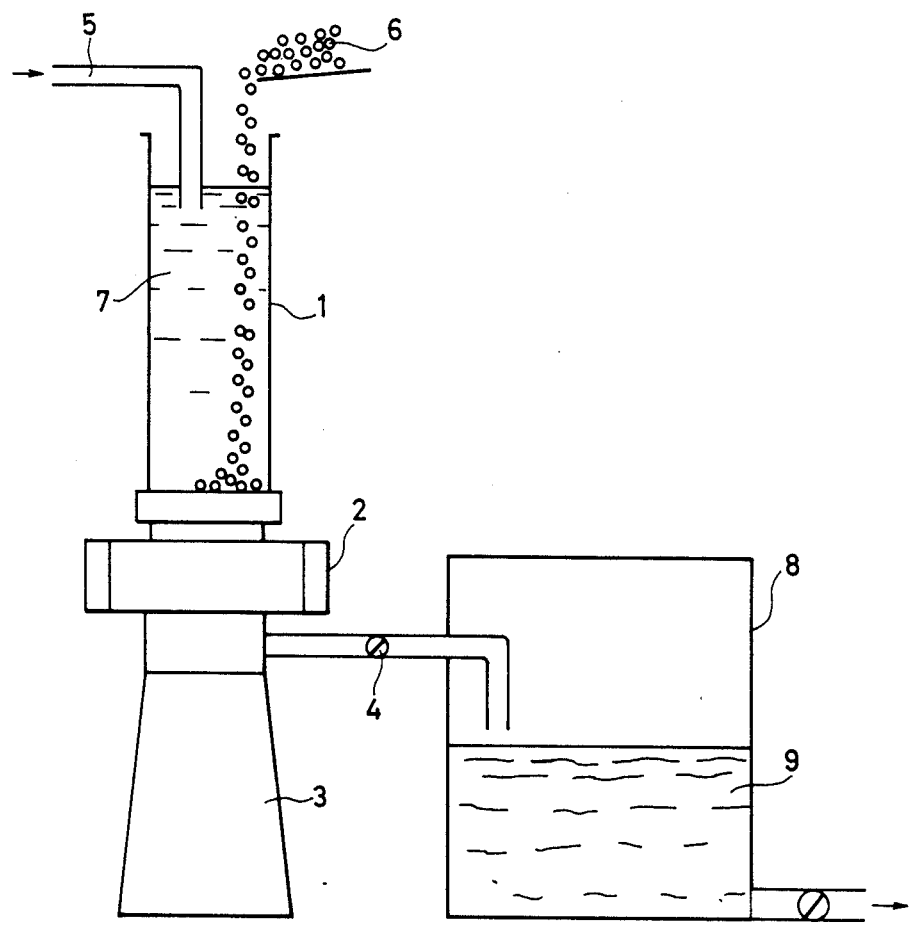
FIG. 1 is an explanatory view for a crushing device used in this invention.

The soy beans may be crushed in hot water with any type of a device. For example, a device as shown in FIG. 1 is used. In FIG. 1, there are shown hopper 1, crushing stage 2, motor 3, cock 4, hot water introduction pipe 5, soy beans 6, hot water 7, reservoir tank 8 and crushed liquid 9. In this device, hot water (for example, at 95°–98° C.) is introduced by a certain amount from the hot water introduction pipe 5 to form the hot water 7, to which the soy beans 6 are continuously added by a certain amount. Then the soy beans are crushed by being fed continuously to a crusher in the crushing stage 2 rotated by the motor 3, and the crushed soy beans are sent to the reservoir tank 8 in a controlled amount together with the hot water through the half-opened cock 4, where they are subjected to high temperature-maintaining (for example, 90°–98° C) for a certain time and the enzymes are substantially deactivate the enzymes.

The temperature of the hot water used in this invention is suitably 85° C. or more, and a high temperature of 95°–98° C. is preferred. The higher the temperature is, the more dissolved oxygen is excluded, suppressing the reaction of elaminating lipoxidase and the generation of the raw odor. In addition, a higher tmeperature is preferred since temperature in crushing is lowered to 90°–93° C. when not using a device for heating or retaining heat, because of the low temperature of the soy beans fed. However, it should be noted that an extremely high temperature will thermally denature the protein in the subsequent high temperature-maintaining step and worsen the extraction rate in some cases.

It is preferable that the slurry of crushed soy beans, which is continuously sent from the crusher, is fed to a maintaining tube or a reservoir tank and maintained. To be concrete, the slurry is treated by the following process: a certain content of a tube is insured by jointing tubes, and the slurry is poured into the jointed tube. The slurry freshly sent is continuously passed through and maintained all during passage and then the slurry in which the enzymes have been deactivated is taken out.

In this invention, the activity of the lipoxidase is eliminated in the slurry which has been maintained at a high temperature of 85° C. or more, especially 85°–90° C., for 0.5–5 min.

In addition, in this invention, it is confirmed that the slurry of crushed soy beans which has been treated by maintaining at 95° C. or more for 4 min. or more, does not contain the lipoxidase, simultaneously the amount of the trypsin inhibitor is 10 TIU/mg protein or less.

The slurry of crushed soy beans which has been treated by maintaining at a high temperature of at least 85° C. or more, is susequently ground. Grinding is preferably performed with a grinding machine such as a colloid mill.

Then insoluble solid matter is separated with a centrifuge and by filtering, etc. to yield soy bean milk.

Next, examples of examination and performance of this invention are shown.

EXAMPLE OF EXAMINATION

One kg of intact soy beans were crushed by feeding them to a crusher and pouring 6 kg of hot water and water vapor to obtain a slurry of crushed soy beans at a high temperature.

In the subsequent maintaining, temperatures of 80° C., 85° C., 90° C. and 95° C. and a retaining time of 30–300 sec. were established. During the period of maintaining, the temperature the crushed slurry was taken out by a certain amount and each of the crushed slurry was ground and then insoluble solid matter was separated from the so obtained ground slurry of soy beans with a decanter to obtain soy bean milk. Each batch of soy bean milk was obtained by cooling the resulting liquid.

Each batch of soy bean milk was subjected to sensory testing for the determining existance of the raw odor and to measurement of the activity of residual trypsin inhibitor.

Results of sensory test for a raw odor are shown in the following Table 1.

TABLE 1

| Temperature/sec (°C.) | Relation between generation of a raw odor and maintaining time | | | | | |
|---|---|---|---|---|---|---|
| | Sensory test | | | | | |
| | 30 | 60 | 120 | 180 | 240 | 300 |
| 95 | − | − | − | − | − | − |

TABLE 1-continued

| Temperature/sec (°C.) | Relation between generation of a raw odor and maintaining time | | | | | |
|---|---|---|---|---|---|---|
| | Sensory test | | | | | |
| | 30 | 60 | 120 | 180 | 240 | 300 |
| 90 | − | − | − | − | − | − |
| 85 | − | − | − | − | − | − |
| 80 | + | + | + | ± | ± | ± |

Figure 2:
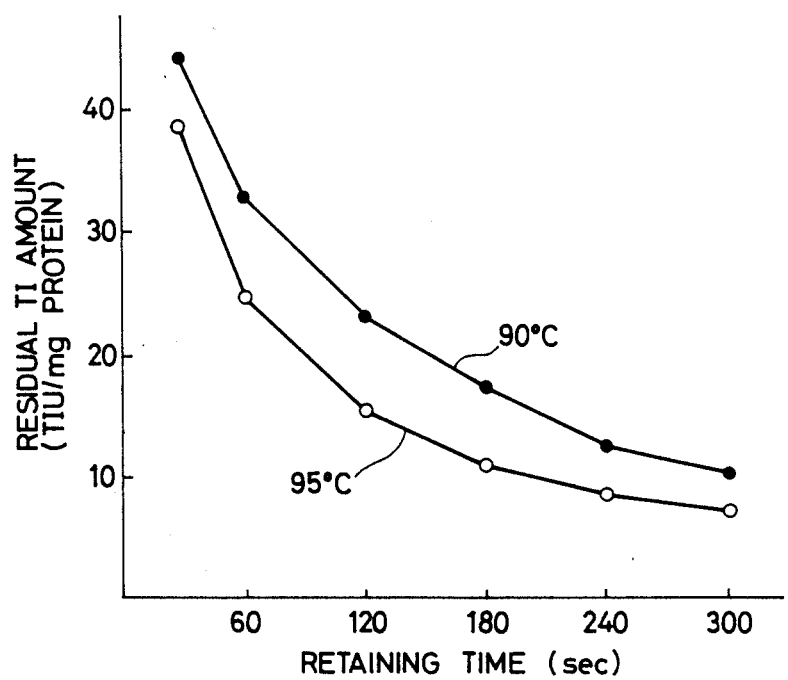
FIG. 2 is a chart of the residual TI amount during a period of 30 to 300 sec. at temperatures of 90° C. and 95° C.
Figure 3:
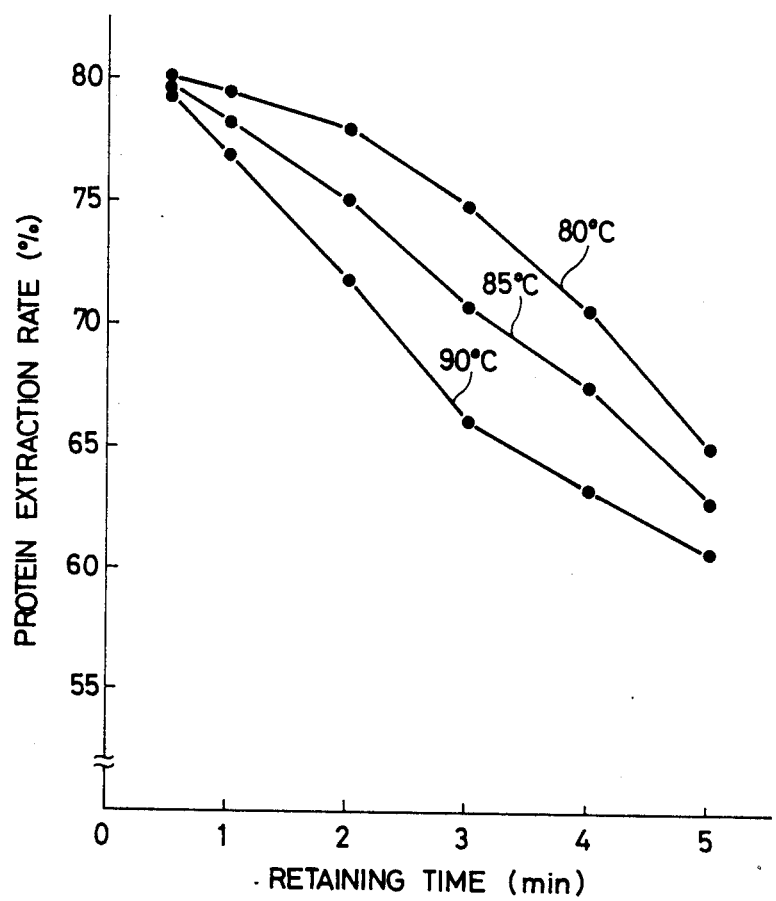
FIG. 3 is a chart for the protein extraction rate determined at each of temperatures.

− represents the absence of a raw odor
± represents the presence of a slightly raw odor
+ represents the presence of a raw odor Next, the activity of the residual trypsin inhibitor is shown in FIG. 2. It is revealed that the activity of the residual trypsin inhibitor was decreased to 10 TIU/mg protein by treating 95° C. for 240 sec.

As a result, it is revealed that in case of treating at 85°–90° C., the raw odor ceases to be sensed, however, the resulting soy bean milk is not appropriate as soy bean milk because of the high activity of the residual trypsin inhibitor.

EXAMPLE 1

Intact soy beans of 2.5 kg were continuously fed to a crusher together with hot water and water vapor which have a temperature of 98° C. to yield the slurry of crushed soy beans of 95° C. continuously.

The so obtained slurry of the crushed soy beans was introduced into a holding tube and high temperature-maintaining was performed at a slurry-temperature of 95° C. for 300 sec. The thus obtained slurry was fed to a grinding machine and then insoluble solid matter was separated with a vibrating screen of 200 mesh to yield 10 kg of soy bean milk of pH 7.0 which contains 4.8% protein.

As for this soy bean milk, there was not the generation of the raw odor caused by the lipoxidase and the activity of the residual trypsin inhibitor was only 10 TIU/mg protein.

EXAMPLE 2

Intact soy beans in the amount of 7.5 kg were crushed with a crusher in which the absence of air was maintained by the use of 45 kg of a 0.1% solution of sodium bicarbonate. The particle size of the crushed soy beans ranged from about 0.5 to 1.0 mm square. The so obtained crushed liquid had a temperature of 90° C. and no raw odor, and in addition, contained a residual TI amount of 45 TIU/mg protein. Furthermore, the crushed liquid was sent to a reservoir tank and maintained at a high temperature of 90° C. for 60 sec. and then passed through a grinding machine to be ground as fine as possible. Thereafter, insoluble solid matter and soy bean milk were separated with a centrifuge. The protein content in 33.7 kg of soy bean milk was 6.0% and the protein extraction rate was 75.9%. A raw odor was not recognized at all.

What is claimed is:

1. In a process for preparing soybean milk comprising grinding soybeans in a hot aqueous medium and removing bean-cured refuse, the improvements comprising:
    crushing soybeans into square pieces having a size on the order of 0.2 to 2.0 mm in a hot aqueous medium of 85° to 98° C., maintaining the resulting crushed slurry at 95° to 98° C. for at least 240 seconds to deactivate lipoxidase and trypsin inhibitor, grinding the slurry, whereby the protein extraction rate of the slurry is increased from about 50%, which is obtained when soybeans are ground to a size not greater than 0.1 mm and heated at 95° to 98° C. for at least 240 seconds, to about 60%, removing bean cured refuse from the slurry to leave soybean milk, and sterilizing the resulting soybean milk.

* * * * *